United States Patent [19]
Carapellucci

[11] 3,924,480
[45] Dec. 9, 1975

[54] CONSTANT HORSEPOWER VARIABLE SPEED REVERSING TRANSMISSION

[75] Inventor: Joseph Carapellucci, Broomall, Pa.

[73] Assignee: Diamond Seven, Inc., Springfield, Pa.

[22] Filed: Sept. 11, 1974

[21] Appl. No.: 505,079

[52] U.S. Cl.............................. 74/230.17 A; 74/710
[51] Int. Cl.² ...................... F16H 55/52; F16H 1/38
[58] Field of Search...... 74/713, 710, 665 B, 665 A, 74/230.17 A, 665 P

[56] References Cited
UNITED STATES PATENTS

| 2,117,340 | 5/1938 | Maurer | 74/230.17 A X |
| 2,179,933 | 11/1939 | Heyer | 74/230.17 A X |
| 2,360,076 | 10/1944 | Shaw | 74/230.17 A |
| 3,376,760 | 4/1968 | Gordonier | 74/230.17 A X |

Primary Examiner—Leonard H. Gerin
Attorney, Agent, or Firm—Frank J. Benasutti Associates, Ltd.

[57] ABSTRACT

A variable speed transmission uses bevel gears to achieve continuity in horsepower output in either forward or reverse. Several embodiments are shown. In the preferred embodiment, the gears are arranged so that variation in the speed of the input gear in one direction determines both the speed and the direction of rotation of the output shaft.

13 Claims, 4 Drawing Figures

3,924,480

CONSTANT HORSEPOWER VARIABLE SPEED REVERSING TRANSMISSION

BACKGROUND OF THE INVENTION

This invention relates to transmissions, and more particularly, to transmissions which will give a constant horsepower output at varying speeds.

In the prior art, transmissions, such as those used in motor vehicles, provide certain functions, such as variations in speed, direction and horsepower. Often these devices involve clutches, such as the fluid transmissions in modern day automobiles. It is typical in such devices to use planetary gear systems (see for example, British patent specification No. 1,238,121, 1971) which are not only complicated and expensive, but also do not provide constant transmission characteristics in both directions. Such transmissions, particularly when used in combination with fluid clutches, may provide constant torque, but do not provide constant horsepower output.

SUMMMARY OF THE INVENTION

By my invention, I have provided a constant horsepower variable speed reversing transmission which overcomes the disadvantages of the prior art. By the use of a simple bevel gear system, the embodiments of my invention provide a highly efficient, inexpensive and easy to use transmission having a great many advantages over prior art devices. In particular, horsepower is constantly transmitted from the input through the output shaft at all speeds, both forward and reverse. The gears are in constant mesh and there is no disengaging and re-engaging as there is in mechanical clutches, and no slippage as there is in fluid clutches. A single control lever will completely control forward, neutral and reverse with an infinite variation in speeds.

Accordingly, it is an object of my invention to provide such a device which overcomes the prior art disadvantages and this and other objects of my invention will become apparent from the following description with reference to the accompanying drawings.

DESCRIPTION OF THE PREFERRED EMBODIMENT

Figure 1:
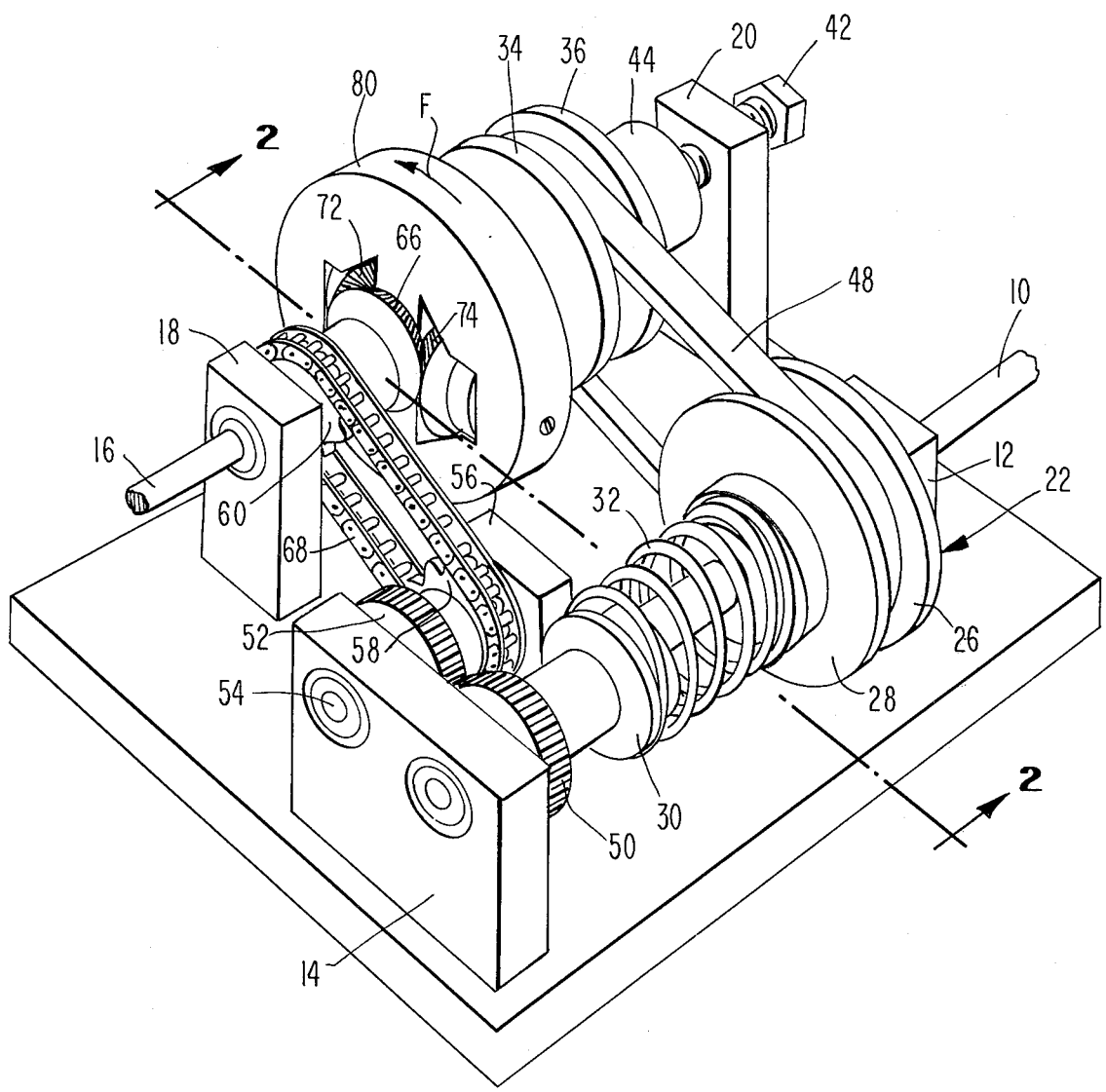
FIG. 1 is a perspective view of an embodiment of my invention.

Although specific forms of the invention have been selected for illustration in the drawings, and the following description is drawn in specific terms for the purpose of describing these forms of the invention, this description is not intended to limit the scope of the invention which is defined in the appended claims.

Figure 3:
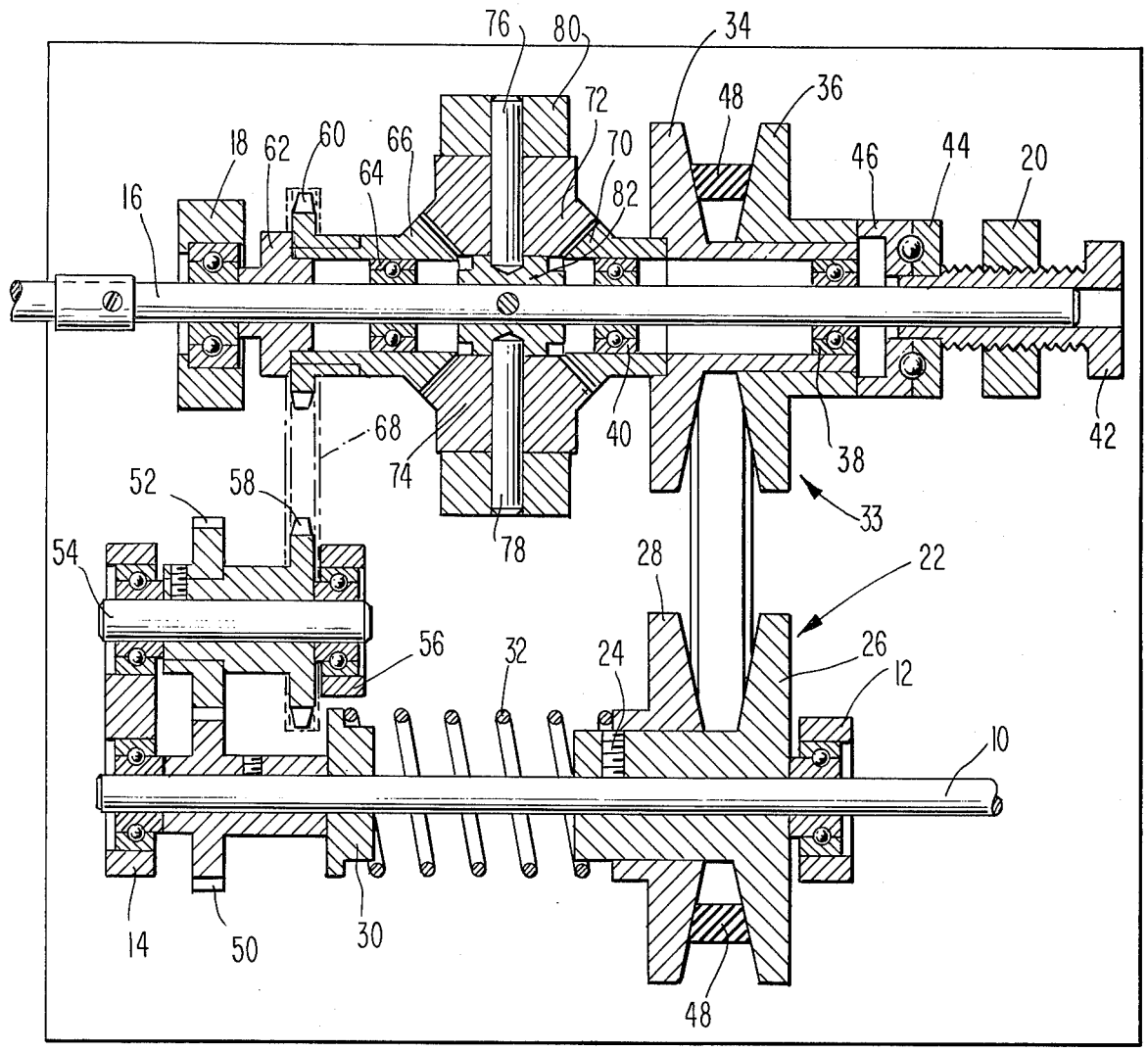
FIG. 3 is a section of the device shown in FIGS. 1 and 2 taken as indicated by the lines and arrows 3—3 in FIG. 2.
Figure 2:
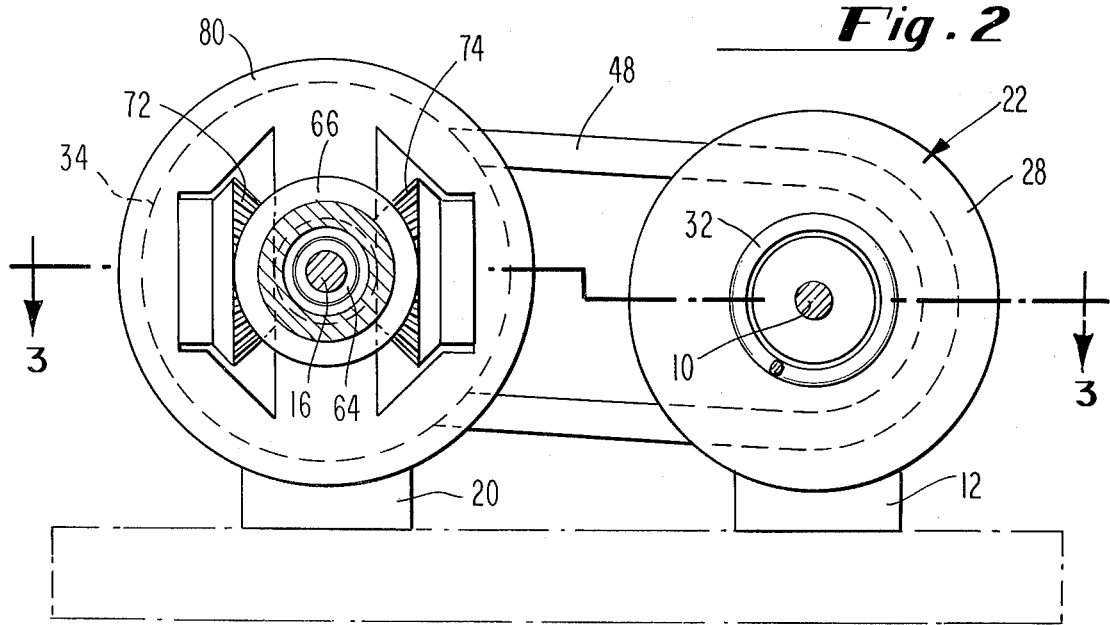
FIG. 2 is a section taken as indicated by the lines and arrows 2—2 in FIG. 1.

Referring to FIGS. 1, 2 and 3, the embodiment shown comprises a power input shaft 10 suitably mounted for rotation in bearings disposed in bearing blocks 12 and 14.

The power output shaft 16 is likewise mounted for rotation and supported within a frame comprising the members 18 and 20. The input and output shafts are parallel to one another. Affixed for rotation to the power input shaft is the drive pulley (designated generally 22) forming the first portion of a variable speed transmission means of the present invention. This transmission means is commonly known as a Reeves variablespeed transmission and comprises two pairs of cone-shaped discs mounted on shafts and connected by means of a V-belt for power transmission. The shafts are generally splined or in some way keyed to the discs, and in the illustration shown in FIG. 3 a set screw 24 is used to fix the position of one of the discs 26 on the input shaft 10 so that the disc 26 rotates therewith. The mating disc 28 is in sliding engagement on the hub of the disc 26 and can move toward or away from that disc along the hub. A collar 30 is fixed on the shaft 10. Disposed between the collar and the hub of the disc 28 is a spring 32 which maintains a force on the disc 28 forcing it toward the disc 26. The second position of this transmission means is the pulley designated generally 33, which also comprises two discs 34, 36, FIG. 3. Disc 34 is mounted for rotation about the output shaft 16 on bearings 38 and 40. It will be noted that bearing 40 is retained in the hub of a bevel gear 70 which is fixedly connected to the disc 34 by any suitable means for rotation therewith. The other disc 36 is mounted in sliding engagement on the hub of the disc 34 for axial movement with respect to it.

A variety of means may be provided for moving the discs toward and away from each other, and in the illustration shown a simple bolt 42 is provided which is threaded through the frame member 20. The bolt has an axial bore which forms a bearing for the end of the shaft 16. At the outboard end of the bolt its configuration is that of a hex nut as shown in FIG. 1, so that a wrench may be applied to it to turn it. As it is turned in one direction or the other, it is advanced or retracted axially with respect to the disc 36. The other end of the bolt is of a reduced diameter which forms a shoulder with the remainder of the bolt and retains the bearing 44. A portion 46 of this bearing is in the form of a collar which abuts the hub of the disc 36 to position it on the hub of the disc 34.

The driving force between these discs is carried by the V-belt 48. In the position shown in FIG. 3, the discs are equally spaced in both pulleys, therefore, the speed ratio between the driving and driven shaft pulleys is 1:1. By varying the distance between the discs, a variety of desired speed ratios can be obtained. This variation in speed is accomplished in the embodiment shown by rotating the bolt 42. As will be apparent from FIG. 3, if the bolt 42 is advanced toward the disc 36 the bearing 44 and collar 46 would be advanced with the bolt, exerting a pressure on the hub of the disc 36 which would advance it toward the disc 34, thus narrowing the V-shaped distance between them. Since the V-belt is of a constant dimension in width, it would move radially outwardly away from the shaft 16 within the V-groove, thus it would be rotating on a larger diameter and consequently at a lower speed. As the belt is advanced radially outwardly from the shaft 16, that portion of the belt 48 which is positioned about the drive pulley 22 would be advancing radially inwardly toward the drive shaft 10, thus forcing the disc 28 to move away from the disc 26 against the action of the spring 32. That portion of the belt passing about the pulley 22 would now be traveling on a smaller diameter and therefore at a higher speed. It will be apparent from what has been said that retraction of the bolt 42 will have the reverse effect; that is, the diameter of the pulley 22 will increase, lowering the speed, and the diameter of the pulley 33 will decrease, whereby raising its speed.

The Reeves transmission can provide constant horsepower at various speeds and is generally used in the range of 2 horsepower to 100 horsepower. It should be noted that both pulleys are rotating in the same direction.

Fixedly mounted on the shaft 10 is a spur gear 50. This engages the spur gear 52, which is mounted on the idler shaft 54, which in turn is supported for rotation in bearings in the blocks 14 and 56. The gears 50 and 52 have a 1:1 ratio.

A sprocket gear 58 is also mounted on the idler shaft 54 for rotation with the shaft and with gear 52. Another sprocket gear 60, having a 1:1 ratio with sprocket gear 58, is mounted for rotation about the shaft 16, on bearings 62 and 64. It will be noted that bearing 64 is disposed within a bevel gear 66 which is suitably connected by its hub to the hub of the sprocket gear 64 for rotation therewith. The sprockets are in driving engagement with one another by means of the chain 68.

As the gear 50 rotates in the same direction as the drive pulley 22 and the shaft 10, it will be apparent that the bevel gear 66 will rotate in the reverse direction to the bevel gear 70. This is because the gear 52 on the idler shaft 54 will be rotating in a reverse direction from the gear 50; the gear 58 will be rotating in the same direction as the gear 52 and will be pulling the chain 68 to rotate the gear 60 in the same direction as the gear 58; and the gear 66, because of its connection to the gear 60, will be rotating in the same direction as the gears 60, 58 and 52 and the shaft 54. Since the gear 70 is connected to the disc 34 of the driven pulley 33, it will be rotating in the same direction as the drive pulley 22 and shaft 10. Thus, the gears 50, 52 and sprockets drive 58, 60, 68 provide a reversing drive means for the bevel gear 66.

At the heart of the present invention is the bevel gear transmission. In this embodiment, bevel gears 72 and 74 are mounted for rotation about the stud shafts 76, 78 respectively, supported in a cage 80, which comprises a ring about the bevel gears 72 and 74 and which retains the shafts 76 and 78. A block 82 is disposed about the shaft 16 and is pin connected thereto and engaged with the ends of the shafts 76 and 78 for rotation with the ring 80. Thus, when the ring 80 rotates, so does the output shaft 16.

This differential transmission operates as follows. With all the gear ratios at 1:1 and the input shaft 10 rotating, the bevel gears 72 and 74 will rotate on their axes, but will not orbit the shaft 16. Therefore, the cage 80 will remain stationary. Note that this results from the condition previously described wherein the bevel gears 66 and 70 rotate at the same speed, but in opposite direction. By varying the speed of the Reeves drive, the relative speed of the bevel gears 66 and 70 will change and the cage 80 will respond by rotating in response to the faster gear. Thus, if the bolt 42 were retracted, the diameter of the pulley 33 would decrease, and the diameter of the pulley 22 would increase, thereby driving the driven pulley 33 about the output shaft at a higher speed. Since the pulley 33 is connected to the bevel gear 70, that gear would be driven at a higher speed than the gear 66. This would result in driving the cage in the forward direction as indicated by the arrow F in FIG. 1. This would drive the output shaft in the same direction. Note that the gears 72 and 74 are not only rotating about their axes, but also orbiting the shaft 16. Force transmission to the output shaft is provided by means of the block which is connected to the cage and the shaft.

Conversely, if the bolt 42 were advanced axially to the left from the position shown in FIG. 3, the pulley 22 would drive the mating pulley 33 at a slower speed and this would cause the bevel gear 70 to rotate at a speed slower than the bevel gear 66. The cage would therefore be driven in a reverse direction from that designated by the arrow F in FIG. 1 and the output shaft would respond by being driven in that direction. The power transmission, then, is through the entire system of constantly engaged gears, pulleys, and sprockets, and the cage which is pinned to the block, and through it, to the output shaft.

This power transmission is highly efficient and is the same in both directions, a condition that does not exist when using planetary gear systems. It should further be noted that the power transmission divides the load between the sprocket and chain on the one hand and the Reeves variable speed V-belt transmission on the other. Also the gears are always in engagement with one another, and torque and horsepower are constantly transmitted from the power input shaft through the power output shaft.

Figure 4:
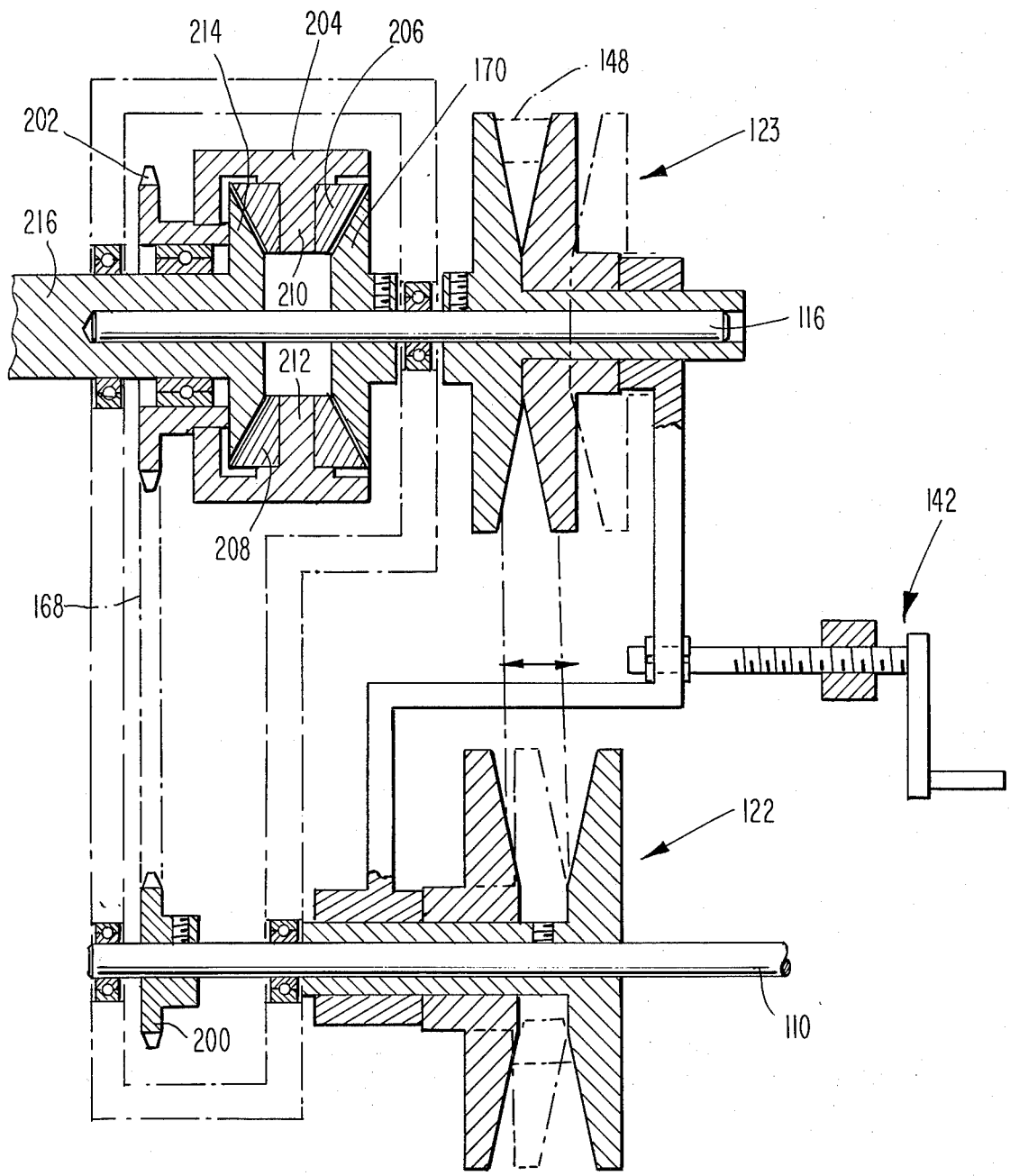
FIG. 4 is a section similar to FIG. 3 showing an alternate and preferred embodiment of my invention.

The preferred embodiment shown in FIG. 4 involves even fewer parts. Here again, I have provided parallel power input and output shafts 110 and 116 and a Reeves variable speed transmission having a drive pulley and driven pulley designated generally 122 and 123 respectively, and a means, designated generally 142, for adjusting the diameter of the pulleys between the position shown in full lines and the position shown in phantom lines. The operation of the pulleys through the medium of the belt 148 will not be described further as it is identical to the operation described in connection with the embodiment shown in the first three figures.

In this embodiment, the idler shaft and gears are eliminated from the drive means. Instead, a sprocket gear 200 is mounted for rotation on the shaft 110. Through the medium of the chain 168 it drives a sprocket gear 202 which has a 1:2 ratio to the gear 200. With this exception, the gear ratios are 1:1 throughout. The sprocket gear 202 is mounted for rotation about the shaft 116 on bearings disposed between it and the output shaft 216. The shafts 116 and 216 are coaxial and are mounted to rotate with respect to one another. The shaft 116 has mounted thereon a bevel gear 170 which rotates with the driven pulley 123 and the shaft 116. The cage 204 is fixedly connected to the sprocket gear 202 in any suitable fashion to rotate therewith. The cage supports oppositely disposed bevel gears 206, 208 mounted for rotation about suitable shaft members 210, 212 respectively, which are diametrically opposed in the cage 204. In this embodiment, power transmission is not through the cage to the shaft, but rather through one set of gears to another. The output shaft 216 has a bevel gear 214 thereon which engages the bevel gears 206, 208 mounted in the cage.

In operation, when the input shaft turns and the pulleys of the variable speed transmission have a 1:1 ratio, the output shaft 216 does not move. The shafts 110 and 116 are running at the same speed. The sprocket 202 is running at onehalf of the speed of the sprocket 200, thus, the cage 204 is rotating in the same direction as the bevel gear 170, but at half the speed. The gears 206 and 208 are rotating on their axes and walking about the face of the gear 214. Note that the gears are working, that is, they are in motion, but there is no load being transmitted to the output shaft.

If the gear ratio is changed in the variable speed transmission, such that the driven pulley 123 is driven at a speed of one-half that of the drive pulley 122, then the bevel gear 170 will be driven at the same speed as the gear 202. This creates a locked condition, that is, there is no motion between the gears 170 and 206 and 208. The cage is thus rotating about the shafts 116 and 216 and the output shaft will therefore turn in the same direction and at the same speed as the gears 170, 214. Note that in this condition, the gears within the differential are not dynamically working against one another, that is, they are transmitting their load in a static condition.

If the variable speed transmission is adjusted so that the pulley 123 is going twice as fast as the pulley 122, the gear 170 will be traveling at four times the speed of the gear 202 and the gear 206, 208 will not only rotate upon their axes, but will be turning the gear 214 in the opposite direction.

It will be noted from what has been said that when the pulley 123 is larger than the pulley 122 and turning at one-half the speed of 122, it is actually driving the pulley 122 when considered in light of the laws of conservation of energy. Therefore, energy which is normally lost in the transmission is being transmitted back into the gear train.

It will be understood that various changes in the details, materials and arrangement of parts which have been herein described and illustrated in order to explain the nature of this invention may be made by those skilled in the art within the principle and scope of the invention as expressed in the following claims.

It will further be understood that the Abstract of the Disclosure set forth above is intended to provide a non-legal technical statement of the contents of the disclosure in compliance with the Rules of Practice of the U.S. Patent Office, and is not intended to limit the scope of the invention described and claimed herein.

What is claimed is:

1. A constant horsepower variable speed reversing transmission, comprising:
   a. an input shaft;
   b. an output shaft spaced from said input shaft;
   c. a variable speed transmission having: a first portion; a second portion; and connecting means engaging said portions to rotate said second portion at a speed dependent upon the speed of said first portion; said first portion engaging said input shaft to rotate in response thereto;
   d. drive means having a first portion engaging said input shaft for rotation therewith and a second portion rotationally driven in response to the rotation of the first portion thereof;
   e. a bevel gear connected to said second portion of said variable speed transmission for rotation therewith;
   f. a cage comprising a ring having at least one bevel gear engaged with said first mentioned bevel gear, a supported therein for rotation about its axis;
   g. an additional bevel gear engaging the bevel gear supported within said cage; and
   h. force transmission means coacting with and engaging said cage, said second portion of said driven means, said additional bevel gear, and said output shaft to transmit the force necessary to rotate said output shaft in response to rotation of said input shaft;
   i. the ratio of said gears being such as to rotate said output shaft in either forward or reverse depending on the speed of rotation of said variable speed transmission.

2. The invention of claim 1 wherein said force transmission means comprises a fixed connection between said second portion of said drive means and said cage so that said cage rotates therewith; and a fixed connection between said last mentioned bevel gear and said output shaft, so that said output shaft rotates therewith.

3. The invention of claim 2 wherein said input shaft is parallel to said output shaft and an intermediate shaft is provided which is coaxial with said output shaft and which supports said second portion of said variable speed transmission for rotation therewith.

4. The invention of claim 3 wherein said coaxial shafts are disposed such that the intermediate shaft extends within said output shaft for support in a rotating fit therewith.

5. The invention of claim 2 wherein said first portion of said drive means comprises a first sprocket gear mounted on said input shaft; and said second portion of said drive means comprises a second sprocket gear fixedly connected to said cage; and said drive means further comprises a chain connecting said gears so that said first sprocket gear drives said second sprocket gear.

6. The invention of claim 2 wherein said variable speed transmission is comprised of a plurality of cone-shaped discs forming a plurality of pulleys and having a V-belt connecting them to drive one in response to rotation of the other.

7. The invention of claim 1 wherein said force transmission means comprises a fixed connection between said second portion of said drive means and said last mentioned bevel gear; and a fixed connection between said cage and said output shaft.

8. The invention of claim 7 wherein said ring is disposed about said output shaft and said last mentioned fixed connection is within said ring.

9. The invention of claim 8 wherein a block is connected to said output shaft within said ring to form said last mentioned fixed connection.

10. The invention of claim 9 wherein a plurality of bevel gears are supported for rotation about their axes within said ring on radially extending shafts and said block is connected to said cage by extension of said shafts holding said bevel gears within said ring.

11. The invention of claim 7 wherein said drive means comprises a first gear mounted on said input shaft for rotation therewith; an idler shaft mounted for rotation within bearing blocks; a second gear mounted on said idler shaft for rotation therewith and engaging said first mentioned gear for rotation in response thereto; a sprocket gear mounted for rotation on said idler shaft to rotate in response to rotation thereof; a second sprocket gear connected to said last mentioned bevel gear for rotation therewith; and a chain supporting said sprocket gears to rotate one in response to the other.

12. The invention of claim 7 wherein said input and output shafts are parallel to one another and the first portions of said variable speed transmission and said drive means are mounted for rotation on said input shaft so that they will rotate therewith and the second portion of said variable speed transmission and said drive means are disposed about said output shaft so that they rotate thereabout.

13. The invention of claim 7 wherein said variable speed transmission comprises a plurality of cone-shaped discs forming a plurality of pulleys and having a V-belt connecting them to drive one in response to rotation of the other.

* * * * *